United States Patent

[11] 3,593,676

| [72] | Inventors | Francis R. Reid;<br>Selwyn Jones, both of Minneapolis, Minn. |
|---|---|---|
| [21] | Appl. No. | 813,504 |
| [22] | Filed | Apr. 4, 1969 |
| [45] | Patented | July 20, 1971 |
| [73] | Assignee | The Pillsbury Company<br>Minneapolis, Minn. |

[54] DOUGH SHEETING APPARATUS
14 Claims, 6 Drawing Figs.

| [52] | U.S. Cl. | 107/12 |
|---|---|---|
| [51] | Int. Cl. | A21c 3/02 |
| [50] | Field of Search | 18/2, 9, 10;<br>107/12, 10, 1 |

[56] References Cited
UNITED STATES PATENTS

| 2,726,922 | 12/1955 | Merrill et al. | 18/2 |
|---|---|---|---|
| 3,151,508 | 10/1964 | Holman et al. | 18/2 |
| 3,402,681 | 9/1968 | Mandikian et al. | 107/12 |
| 3,476,058 | 11/1969 | Watkin et al. | 107/12 |

*Primary Examiner*—Henry S. Jaudon
*Attorneys*—Ronald E. Lund, James V. Harmon and M. Paul Hendrickson ABSTRACT: A dough sheeting apparatus composed of a series of adjacent roll stands each including several pairs of vertically spaced rolls. Each successive pair of rolls is spaced slightly closer together than the one next to it for the purpose of reducing the thickness of the sheet. A depending loop of dough is maintained between each pair of rolls. A sensing arm contacts each depending loop and maintains the speed of the next downstream pair of rolls at an appropriate speed to prevent the dough from stretching or accumulating between the adjacent pairs of rolls.

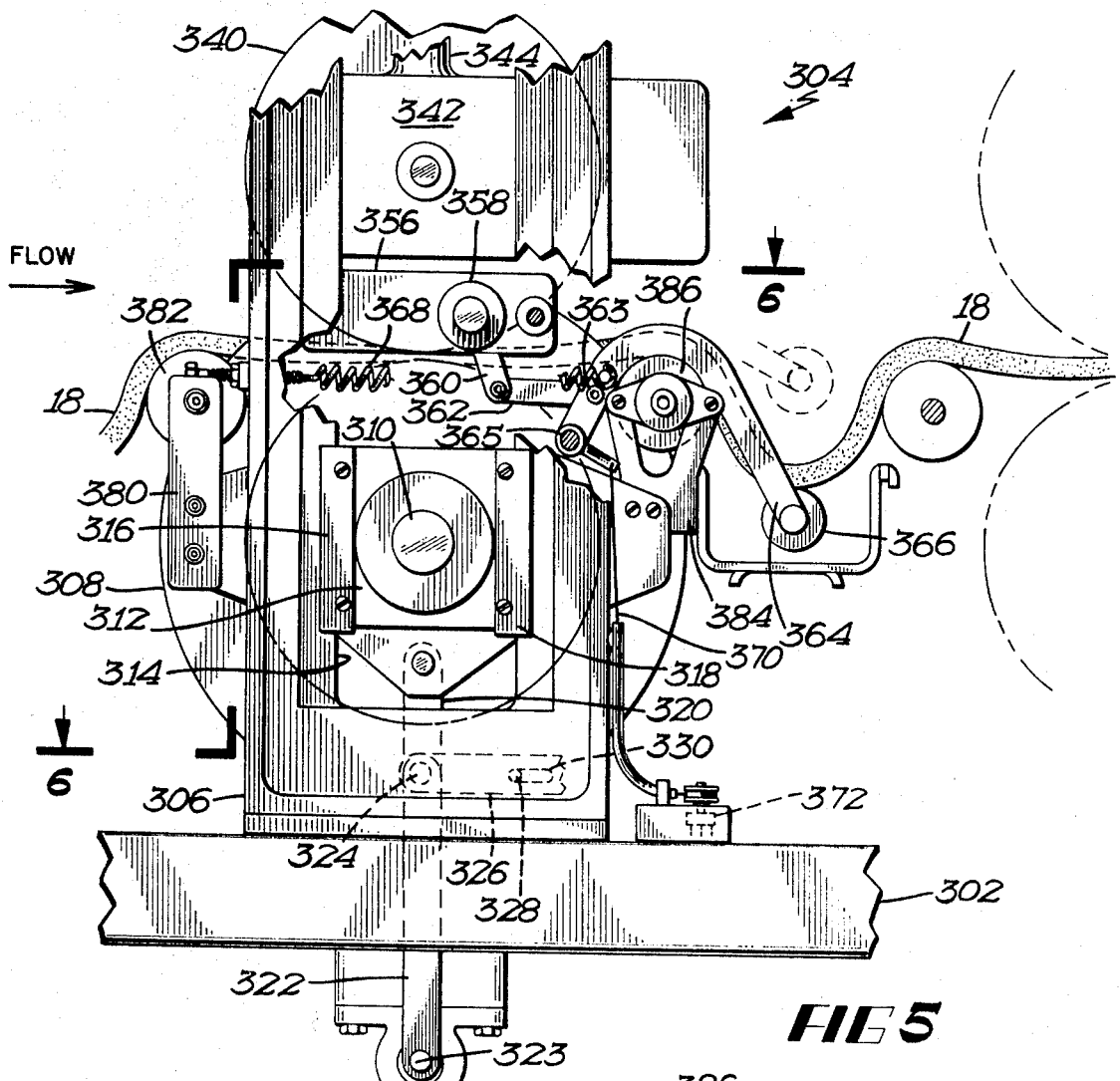
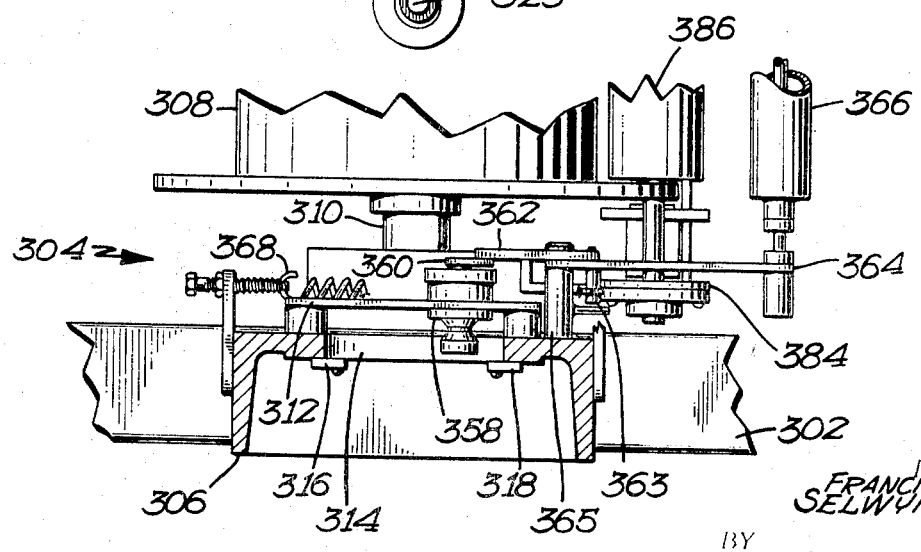

DOUGH SHEETING APPARATUS

This invention relates to dough forming equipment and more particularly to equipment for continuously forming a sheet of dough and advancing the sheeted dough at a predetermined rate. The invention is particularly well-suited for forming sheets of dough which are to be cut into biscuits of the kind that are shipped to the consumer in a refrigerated condition.

Prior equipment for the continuous production of sheeted dough has been unsatisfactory for a number of reasons. One problem has been the necessity of having several operators devote their full attention to running the machine. Another has been the prevention of excessive stretching of the dough or the accumulation of dough between adjacent pairs of rolls.

Anyone who has ever worked with bread or biscuit dough will be familiar with the resiliency that develops as the gluten becomes hydrated. Thus, when a developed dough is stretched it will have a tendency to spring back to its original shape. The springiness of the dough varies from time to time depending upon the grade of flour, the age of the dough from the time it was initially mixed, the amount of mechanical energy to which the dough has been subjected and a variety of other operating variables. The characteristic also changes within the apparatus of the invention from the inlet end to the outlet end because of the mechanical work exerted upon the dough as it passes through the machine. In general, it has been found desirable to work the dough as little as possible in the apparatus and to allow the dough to relax between each reduction in sheet thickness.

In the initial preparation of the dough prior to the sheeting operation, about 25 to about 35 parts of water are added to each 50 parts flour. Starch may be substituted for the flour provided the farinaceous material contains a sufficient amount of gluten (e.g., wheat gluten) to provide a developed dough character hereinafter more fully described. Typical flours or farinaceous materials adaptable include those flours which are conventionally employed in preparing bakery products such as rolls, biscuits, pastry, pie crusts and particularly those flours suitable for preparing refrigerated chemically leavened, laminated dough products adapted for packaging and distribution in pressure retaining containers. Preferably adaptable herein are the hard and soft wheat flours having a wheat protein content ranging from about 9 to about 15 per cent by weight. The dough is usually mixed at a temperature of less than 65° F. under mixing conditions sufficient to provide a dough mass which has a maximum extensographic resistance to extension ranging from about 400 Brabender units to about 900 Brabender units and an extensibility of greater than 100 millimeters but less than about 200 millimeters. The dough is also characterized by having a maximum farinographic reading usually greater than 600 but usually less than about 1300 Brabender units.

A properly mixed dough will have a farinographic reading after 1 or 2 minutes testing within the range of 400 to 700 Brabender units. The farinographic curve will either be level or indicate an increasing viscosity upon additional mixing by the farinographic equipment. An increasing farinographic curve is characteristic of a dough which has not yet reached its maximum state of gluten development. A fully developed dough exhibits a substantially level farinographic curve during the initial farinographic testing.

Normally, the dough being fed to the apparatus embodying the invention is in a developed condition. In other words, the farinograph will register over 600 Brabender units and the dough will have the springy character described above. Accordingly, it will tend to spring back when stretched or after it has passed between a pair of compression rolls.

In development work leading to the present invention, it was discovered that the manual adjustment of the space between each set of rolls leads to operating problems primarily because of variations in the density and the resiliency of the dough. Thus it is necessary to obtain an exact speed match between adjacent sets of rolls. Stretching has been found undesirable because it builds up tension in the dough being processed and tends to reduce the volume of the finished biscuits.

Attempts were made by us to correct these problems by running the dough in a slack condition between adjacent rolls but this frequently resulted in an objectionable buildup in the quantity of material between the rolls. In addition to these difficulties, it was also found that starting up the equipment was a problem since differential loading of the motors caused the motors to start at different speeds. Finally, due to the inability of the apparatus to accommodate for variations in dough characteristics, the finished dough was not always uniform in thickness after standing for a short period of time.

In view of these shortcomings of the prior art, it is one object of the present invention to provide an improved apparatus for processing developed dough in which excessive stretching of the dough is prevented.

Another object of the invention is the provision of an improved apparatus for forming a continuous sheet of developed dough with a provision for reducing the amount of manual attention and adjustment required.

Another object of the invention is the provision of an improved dough sheeting apparatus which will provide a more uniform thickness of the finished dough piece.

Another object of the invention is the provision of an improved dough sheeting apparatus which will accelerate and decelerate smoothly without the necessity of making a number of manual adjustments on the machine.

A further object of the invention is the provision of an improved dough sheeting apparatus which stretches the dough little, if at all.

A still further object of the invention is the provision of an improved apparatus of the type described which will automatically accommodate for differences in dough consistency during a single run.

These and other more detailed and specific objects of the invention will be apparent in view of the following specification and drawings wherein:

FIGS. 1 and 2 together comprise a semidiagrammatic flow and wiring diagram for an apparatus embodying the invention.

FIG. 5 is a partial side elevational view of a roll stand.

FIG. 6 is a partial horizontal sectional view of a roll stand embodying the invention taken on line 6—6 of FIG. 5.

Figure 1:
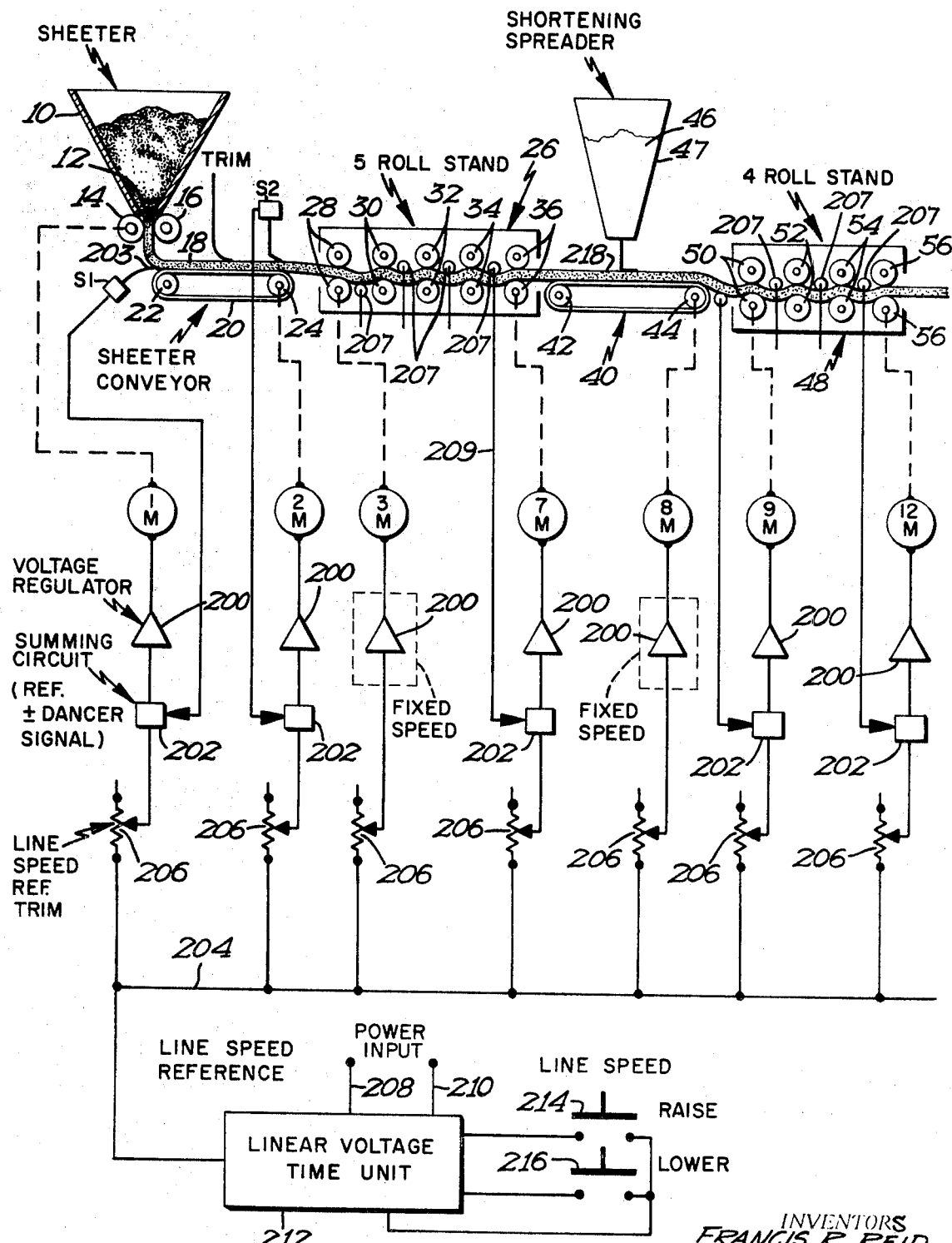

Briefly, the present invention provides the dough sheeting apparatus including a plurality of longitudinally spaced compression elements through which a sheet of dough is fed for the purpose of reducing its thickness. The compression elements normally comprise vertically spaced pairs of driven rolls. The clearance between each pair of rolls is less than the next upstream pair. Each pair is run at a slightly faster speed to accommodate for the reduced thickness of the dough sheet. A depending loop of dough is allowed to exist between each pair of rolls. Sensing means is operatively associated between the depending loop of dough and the adjacent downstream pair of rolls for controlling their speed so as to prevent the dough from being drawn tight between the adjacent roll sets.

To the accomplishment of the foregoing and related ends, the invention then comprises the features hereinafter fully described and particularly pointed out in the claims, the following description setting forth in detail certain illustrative embodiments of the invention, these being indicative, however, of but a few of the various ways in which the principles of the invention may be employed.

Before the apparatus is described, the preparation of the dough will be briefly summarized. A suitable dough composition is prepared by admixing the following components:

| Ingredients | percent by Weight |
| --- | --- |
| flour | 56.5 |
| shortening | 0.5 |
| SAPP | 1.5 |
| soda | 1.1 |
| sugar | 2.7 |
| nonfat dry milk | 1.0 |
| water and ice | 34.0 |
| salt | 1.1 |
| buttermilk solids | 1.2 |
| calcium chloride solution | 1.0 |

In a preferred mixing procedure, the ice and water are place in the mixer. The calcium chloride solution and nonfat dry milk are then added to the mixer. The shortening is then sprayed into the mixer and the buttermilk solids are introduced. Finally, the flour is placed in the mixer. The mixer is then run at high speed until a developed dough is formed (about 6—7 minutes). The leavening material is then added together with salt, sugar and a small amount of flour which was withheld. The resulting dough is then mixed for an additional 2 minutes on high speed. The dough can then be introduced to the sheeting apparatus by placing it in the hopper 10.

It should be understood that the state of development of the dough is not entirely a function of the mixing time but is also dependent upon the composition, moisture content, mixing speed and blade design. Thus, where higher mixing speeds are employed, relatively shorter times are required for carrying the dough to a developed state. The term "developed" as used herein will mean a dough composition having a consistency curve which has reached a level above 600 Brabender units. A developed dough can also be defined as one which is of a suitable composition and has had sufficient working to develop elasticity and a structure capable of efficiently retaining gas.

The dough thus prepared is transferred to the apparatus according to the invention which shall now be described by reference to FIGS. 1 and 2. The dough is first placed in a feeder 10 which comprises a hopper having inclined sidewalls and an outlet 12 at the bottom provided with longitudinally extending horizontally disposed rolls 14 and 16 positioned adjacent to and in alignment with the outlet 12. The Roll 14 is driven by means of a motor 1M in a direction adapted to carry the dough downwardly.

Figure 2:
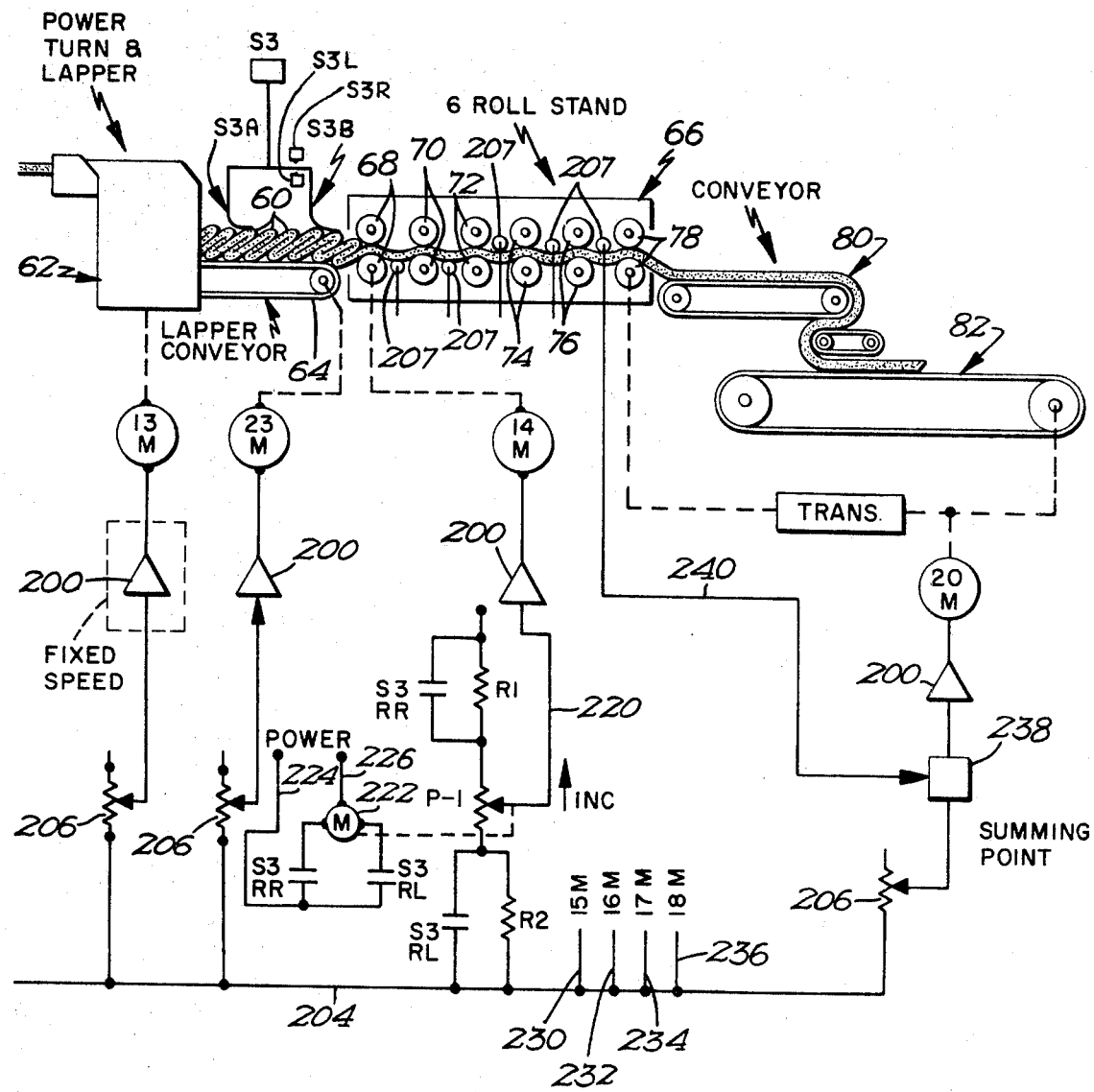

As seen in FIG. 1, the dough 18 passing between rolls 14 and 16 is directed to a sheeter conveyor 20 entrained over rolls 22 and 24 the latter of which is driven by a motor 2M. The dough sheet 18 then passes into a roll stand 26 composed of five longitudinally spaced, vertically separated roll pairs 28 to 30, 32, 34 and 36. Both rolls of each pair are driven by suitable motors 3M—7M. Of these, only 3M and 7M are shown for simplicity of illustration. It should be understood, however, that motors 4M to 6M are identical with 3M and 7M and are controlled in the same manner as motor 7M. From the roll stand 26 the dough 18 passes on to a horizontally disposed conveyor 40 entrained over rolls 42 and 44 and driven by motor 8M. It is at this point that shortening 46 is applied to the upper surface of the dough by a shortening spreader 48 of a suitable, well-known construction. Typically, shortening is extruded on the upper surface of the dough sheet. The side edges of the dough sheet are then folded toward the center in overlapping relationship to enclose the shortening 46.

From the conveyor 40 the dough passes into a roll stand 48 including vertically spaced roll pairs 50, 52, 54 and 56.

The spacing between each succeeding pair 50—56 is somewhat less than the pair adjacent to it. In this way, the thickness of the dough sheet 18 is reduced as it travels through the roll stand 48.

The roll pairs 50—56 are driven by motors 9M through 12M, the motors 10 and 11 have been omitted from the drawing. They are, however, similar to motors 9M and 12M and are controlled in the same manner as motor 7M.

From the four roll stand 48 the dough is formed into a series of vertical overlapping shingled folds 60. This apparatus is referred to as a dough lapper 59; because it is well-known in the art, it will not be referred to in more detail herein. The dough lapper 59 is driven by a motor 13M. The lapper exit conveyor designated 64 is driven by a motor 23M.

From the lapper exit conveyor 64, the dough passes into a 6-roll stand 66 which includes vertically spaced roll pairs 68, 70, 72, 74, 76 and 78. The 6-roll stand 66 is identical to those already described except for the number of rolls. Each pair of rolls is driven by a separate drive motor 14M—18M. Of these, motors, 15M—18M (not shown) are controlled in the same manner as motor 7M. The motor 14M is controlled by means of a differential sensor described below. From the 6-roll stand 66, the dough passes to conveyor 80 and packer conveyor 82 which transfer it to the packer or other processing equipment depending upon the application for which the invention is used.

The motor control circuit will now be described with reference to FIGS. 1 and 2.

Each of the motors 1M through 14M is wired to a voltage regulator 200. Reference voltage is supplied to each of the voltage regulators 200 (except in the case of motors 3M, 8M, 13M and 23M) from a summing circuit 202. The summing circuits in turn receive signals from a bus which provides a master line speed reference signal 204 and from a sensor e.g. S1 which can comprise any form of mechanical fluid or optical sensor which provides an output proportioned to the size of the dough loop, e.g. a linear voltage differential transformer or potentiometer. The sensor S1 includes an arm 203 adapted to follow the movement of the dough sheet 18. The bus is wired to the summing circuit 202 through trimmer potentiometer 206. A master line speed reference signal is supplied by a linear voltage time unit 212, which is controlled by switches 214 and 216. The switch 214 when temporarily closed can be used to raise the voltage of bus 204 and hence increase the line speed. Power is supplied to the linear voltage time unit by power lines 208 and 210.

The motors 1M and 2M are controlled by the sum of the signals from the sensors S1 and S2 respectively and the bus 204 through trimmer potentiometers 206. The motor 3M for the first set of rolls 28 runs at a fixed speed determined by the bus voltage 204 only. A tachometer or the like (not shown) can be connected to the motor 3M for controlling and maintaining a set speed. The voltage regulator 200 of motor 3M is controlled only by the voltage from line 204 through the potentiometer 206.

Between each pair of rolls of the 5-roll stand 26 is a sensor such as dancer roll 207, each of which is connected by means of a conductor 209 to the summing circuit 202 of the next downstream roll pair. Between each pair of compression rolls is a depending loop of dough. Each dancer roll 207 is positioned to engage at the upper or lower surface of the depending loop as desired.

It will be noted that the motor 8M for conveyor 40 is run at a fixed speed determined only by the current in bus 204 and setting of the trimmer potentiometer 206.

The lapper 62 and its conveyor 64 are driven by motors 13M and 23M respectively each of which is supplied with current through a voltage regulator 200 that is connected to the bus 204 through a trimmer potentiometer 206.

The reference voltage is supplied to a motor 14M through conductor 220 from potentiometer P1 having a wiper arm controlled by a motor 222. The motor 222 is, in turn, energized by conductors 224 and 226 through contacts S3RR and S3RL associated with switches S3R and S3L respectively. The potentiometer P1 is connected to bus 204 through a resistance R2 with a contact of S3RL in parallel. The other side of the potentiometer P1 is supplied with current through resistance R1 with a contact of S3RR in parallel. In this way when sensors S3R or S3L are actuated, the voltage at bus 220 is momentarily changed by shorting out resistors R1 or R2 and modified by the moving of the wiper of P1 (due to the operation of motor M) over a much longer time interval, viz until the sensors S3R or S3L are reenergized.

Conductors 230, 232, 234 and 236 supply power from bus 204 to the motors for rolls 70, 72, 74 and 76 respectively in exactly the same manner as in the case of motor 7M.

Both the last pair of rolls 78 of the 6-roll stand 66 and the conveyor 82 leading to the packer are controlled by a motor 20M coupled via one of the voltage regulators 200 to a summing circuit 238. The summing circuit 238 has voltage supplied to it from line 204 through a manual trimmer potentiometer 206 and a voltage on line 240 is in turn controlled by the position of adjacent dancer roll 242.

Thus, during operation, motor 14M has its speed modified when the sensor S3 has its detecting finger S3R raised by the dough sheet 18 to a different height than the sensor finger of the sensor S3A thus contacting S3R. For example, when the motor 14M is running too slowly, the dough will not be advanced at sufficient speed from the lapper conveyor. Accordingly, the finger of S3B will rise with respect thereby to S3L which is not affected by the conditions at the sensor S3B and actuate S3R. As can be seen in FIG. 2, when switch S3R is actuated, the reference voltage in bus 220 is increased momentarily by the closing of contact S3RR. At the same time, a permanent speed correction is made because of motor 222 being energized. This causes the wiper of potentiometer P1 to move in the appropriate direction to increase the voltage supplied by the potentiometer P1. These two events cause the dough under the finger S3B to return to a position that allows the switch S3R to revert to its null position and the actuation of switch S3L results in a slower speed for 14M. Corrections of the speed of motor 14M will continue in this incrumental fashion until the speed of the motor as determined by the position of P1 causes the correct amount of dough to be removed from the lapper feed-out conveyor 64.

This apparatus in this way prevents a pileup of dough in the roll stands due to a speed mismatch between adjacent pairs of rolls. The rolls, moreover, are run at a speed which insures that the dough web is not stretched between succeeding rolls. The loops of depending dough enable the dough to relax and enable internal stresses to be relieved. It can be seen that each section of the roll stand is powered by an individual motor regulator. In each of these motors except for the first one the speed of the roll pair is a function of the algebraic sum of a master line speed reference from bus 204 and a sensing roll positioned to engage the adjacent upstream depending dough loop. Thus, the master line speed reference is individually modified for each section by the position of the adjacent dough loop. This allows each pair of rolls to have its speed adjusted automatically independently of any other pair of rolls.

In addition to the 13 pairs of rolls which are speed-controlled by the depending loops, the sheeter and sheeter conveyor speeds are modified by sensors S1 and S2 respectively. The sensor S1 output is varied by the position of the dough sheet 18 as it travels on to the conveyor 20. The output of sensor S2 is determined by the quantity of dough piled up in front of the first pair of rolls 28 and functions to change the speed of the conveyor 20 as as to maintain the piled up dough at a constant thickness.

The motors 3M, 8M, 13M and 23M run at the speed set by the master line speed reference signal of bus 204.

The first pair of rolls in the 6-roll stand 66 has its speed modified by the switches S3R and S3L which are actuated by fingers S3B moving in relation to fingers S3A. The fingers S3B sense the thickness of dough on the conveyor at a point far enough back from S3A so as not to be affected by dough variations at the input to rolls 50. The speed of the motor 14M is modified to maintain the dough at the input of the roll stand 66 at the same depth as the dough further back on the conveyor.

Figure 4:
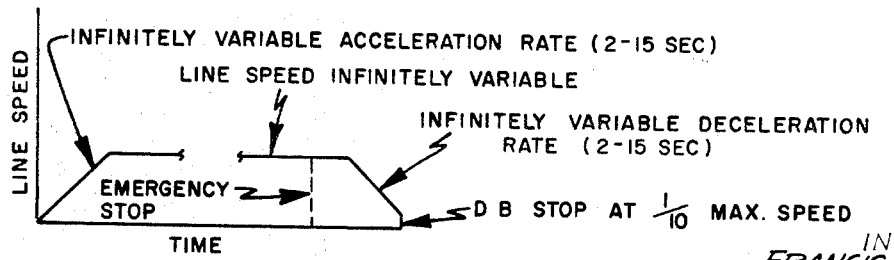
FIG. 4 is a chart illustrating the acceleration and deceleration of motors.

The linear voltage time unit 212 also includes a circuit means for gradually increasing (and decreasing) the line voltage in bus 204 to provide a selected acceleration (and deceleration) rate over a period of from about 2 to 15 seconds as determined by the operator. This provision has two important benefits—it reduces the number of operating problems by preventing the dough from piling up as well as preventing the motors from being overloaded. The acceleration and deceleration of the motors is illustrated in the graph in FIG. 4 in which line speed is plotted against time.

While any suitable circuit can be employed for the linear voltage time unit 212, one suitable commercially available piece of equipment is the SCR Regulator unit manufactured by Seco Electronics Corp. of Minneapolis Minn.

Figure 3:
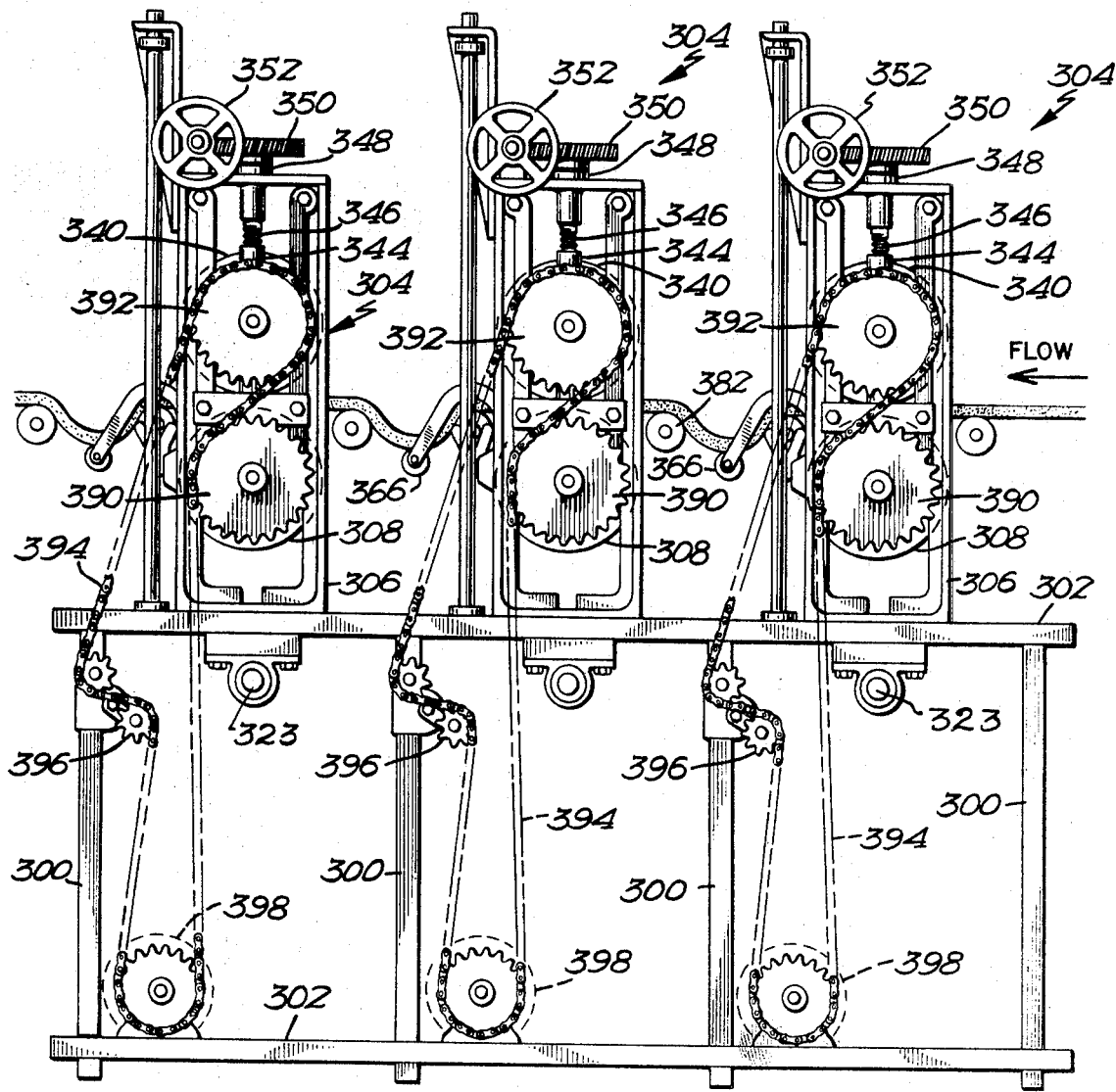
FIG. 3 is a side elevational view of a portion of a roll stand embodying the invention.

The construction of a typical roll stand will now be described with reference to FIGS. 3, 5 and 6. As seen in the FIG. 5, the roll stand includes a supporting framework composed of uprights 300 and horizontal members 302 suitably connected as by welding to provide a framework only a part of which is shown. Mounted upon the framework are longitudinally spaced identical towers 304. Since each of the towers and its associated pair of rolls is identical, only one will be described in detail. Each tower 304 includes two laterally spaced and laterally aligned columns 306 each of which is formed from a channel affixed at its base to the upper surface of the framework 302. Each end of the lower roll 308 of each pair is suitably journaled in a bearing block 310 which is mounted in a bearing block support 312 that is itself positioned for vertical sliding movement within a vertically disposed slot 314 within one of the columns 306. The bearing block support 312 is held in place within the slot 314 by vertically disposed, longitudinally spaced retaining plates 316 and 318.

The lower roll in each roll stand is supported by a pair of vertically disposed quick drop safety links 320, 322 which are pivotally connected together by pivot pin 324 and by a bearing 323 to one of the framework cross members 302. The pin 324 is coupled to a longitudinally extending drop bar 326 which, when moved manually to either the left or right in FIG. 5 will quickly drop the lower roll 308 from the operating position to prevent injury. A stop 328 secured to the tower 304 and engaged through a slot 330 in the drop bar 326 normally holds the drop bar and rolls in their operating position.

Each of the upper rolls 340 is journaled within a bearing block 342 (FIG. 5.) slidably mounted for vertical movement within the slot 314 and supported on each end by a hanger 344 within which is screw-threaded a supporting bracket 346. Each bracket 346 is journaled within a bearing 348 and has connected to its upper end a worm gear 350 which mates with a second gear (not shown) coupled to a handwheel 352. Thus, by turning the handwheel 352, the gear 350 and supporting bracket 346 turn thereby either raising or lowering the bearing block 342.

A supporting plate 356 is welded to the tower 304. Mounted on plate 356 is a hydraulic dashpot 358. The lever arm 360 of the dashpot 358 has connected to it a link 362 which is secured at its left end by pins 363 to a sensing roll supporting lever 364. The sensing roll 366 is journaled at each end between lever arms 364 which are themselves supported upon pivots 365 affixed to the columns 306. A spring 368 is connected between lever arm 364 and the column 306 to counterbalance the sensing roll 366. As can be seen at best in FIG. 5, a cable 370 is connected between the lever arm 364 and a dashpot 372. It is the dashpots 372 that supply current to each of the summing circuits 202. Mounted adjacent to the upstream end of each roll stand upon bracket 380 is an inlet guide roll 382. Similarly, there is mounted upon a bracket 384 adjacent to the downstream side of the roll stand an outlet guide roll 386. The guide rolls 382 and 386 are suitably driven, e.g. by drive motors (not shown).

The drive system for rolls 308 and 340 will now be described by reference to FIG. 3. Entrained over sprockets 390 and 392 mounted upon rolls 308 and 340 respectively is a drive chain 394. A tension control 396 maintains the chain under constant tension. The lower end of the chain 394 is entrained over a sprocker 396 of a drive motor 398 which corresponds to any of the motors 3M through 19M. It will be understood that the speed of the motors 398 will be controlled by the preceding sensor. The depending loop of dough engaged on a roll 366 can be clearly seen in FIG. 5. If desired, a trough can be provided for collecting any excess dough which happens to fall below sensing roll 366.

It is apparent that many modifications and variations of this invention as hereinbefore set forth may be made without departing from the spirit and scope thereof. The specific embodiments described are given by way of example only and the invention is limited only by the terms of the appended claims.

We claim:

1. An apparatus for forming a dough sheet comprising at least two pairs of spaced apart compression elements, each pair of compression elements comprising first and second compression rolls separated by a space of a predetermined size for compressing said dough that is introduced therebetween to reduce the thickness of the sheet of dough traveling at each pair of compression rolls, said thickness reduction inducing stresses into the dough, said dough sheet having a depending dough loop hanging between the first and second pairs of compression rolls, a sensor means operatively associated with the hanging part of the dough loop, said sensor means being operatively connected to the downstream pair of compressing rolls to control the speed of the dough passing therethrough such as to maintain the depending loop of dough present at all times whereby stretching of the dough will be prevented and the internal stresses induced by compression at the rolls is relieved without an uncontrolled accumulation of dough between the first and second pairs of compression rolls and the thickness of the dough sheet being regulated solely by the pressure applied by the rolls.

2. The apparatus from claim 1 wherein the downstream pair of compression rolls is set at a closer spacing than the upstream pair whereby the dough passing between the downstream pair is compressed further than by the upstream pair.

3. The apparatus of claim 1 wherein the sensor means comprises an element adapted to engage the depending dough loop, signal establishing means is operatively connected between the member engaging the dough loop for establishing a voltage of a predetermined strength as a function of the position of the sensor, drive motors for the downstream pair of rolls and means wired between the voltage establishing means and the drive motor for the downstream compression members of said pair to increase the speed of the members if the depending loop becomes too large or to decrease the speed of the downstream compression members when the size of the loop is reduced.

4. The apparatus of claim 1 wherein the compression members comprise rolls and a plurality of said pair of rolls are provided in spaced longitudinal alignment whereby the dough sheet travels successively between each pair of rolls, drive motors are connected to each pair of rolls for driving the rolls in a given feed direction and one such sensor is connected between the adjacent sets of rolls, each sensor being operatively connected to the drive motor of the next downstream set of rolls so as to reduce the speed of the rolls to which it is connected in the event the depending loop engaged therewith is diminished below a predetermined size.

5. The apparatus according to claim 3 wherein voltage regulator means is wired to the drive motors, summing circuit means is wired to the voltage regulator to supply current thereto, said sensor means is operatively associated with the summing circuit, means for establishing a master line speed reference current is connected to the summing circuit, means connecting the output of the summing circuit to the voltage regulator whereby the current supplied to the voltage regulator varies as the algebraic sum of the signal from the sensor and the master line speed reference current.

6. The apparatus according to claim 1 wherein said compression elements include a plurality of roll stands each having a plurality of said pairs of spaced compression members comprising rolls, means rotating the first pair of rolls of the first roll stand at a fixed speed, the downstream pairs of rolls are connected to said sensors and are rotated at a speed controlled by the sensor so as to maintain a depending loop of dough between adjacent roll pairs.

7. A process for forming and compressing a dough sheet comprising, running the dough sheet between pairs of spaced apart driven rolls, reducing the thickness of the dough sheet by reducing the clearance between each successive pair of rolls and thereby temporarily stressing the dough, allowing the dough to accumulate in depending loops hanging between adjacent pair of rolls, sensing the loop condition and controlling the speed of the pair of rolls downstream from the sensed condition of the depending loops to maintain the depending loops present and thereby relieve the temporary stresses and prevent the stretching of the dough or the accumulation of excess amounts of dough between adjacent pairs of rolls and regulating the thickness of the sheet solely by the pressure of the rolls.

8. A process for preparing a dough product composed of at least flour water and shorting comprising admixing the components of the dough until a developed dough is formed having a Brabender value of at least 600, running the dough sheet between pairs of spaced apart driven rolls, reducing the thickness of the dough sheet by reducing the clearance between each successive pair of rolls, allowing the dough to accumulate in depending loops hanging between adjacent pair of rolls, sensing the loop condition and controlling the speed of the pair of rolls downstream from the depending loops thus sensed to maintain the depending loops present and thereby prevent the stretching of the dough or the accumulation of dough between adjacent pairs of rolls.

9. The process according to claim 1 wherein a plurality of pairs of rolls is provided and each successive pair has a clearance therebetween of a smaller size than the next upstream pair whereby the thickness of the dough sheet traveling between the adjacent pairs of rolls is reduced by a predetermined value, each pair of rolls is driven in a given feed direction to advance the sheet between the rolls and the speed of at least some of the rolls is controlled by the condition of the loop immediately upstream from the pair of controlled rolls to maintain the dough loop present adjacent to the controlled pair of rolls.

10. The process according to claim 9 wherein the dough is lapped upon itself in shingled fashion to form multilaminated dough sheet, said multilaminated dough sheet is subsequently run through additional pairs of spaced rolls to further reduce its thickness.

11. The process according to claim 7 wherein the rolls are run continuously to form an endless sheet of dough.

12. The process according to claim 7 wherein the dough is cut into biscuits after it has been reduced to the desired thickness.

13. The process according to claim 7 wherein the dough is first formed into a continuous sheet and is advanced at a predetermined rate between a plurality of said pairs of adjacent rolls and is compressed to a slightly reduced thickness as it passes through each succeeding pair of rolls, said dough sheet being folded back and forth upon itself to provide a laminated structure and is again advanced between spaced pairs of said rolls to reduce the thickness of the dough sheet as the dough sheet passes between each succeeding spaced pair and the sheet is thereafter divided into a plurality of pieces.

14. The process according to claim 7 wherein a master line speed reference signal is established, said sensed position of said depending loop of dough being used to provide a second signal which varies in accordance with the position of the loop and the algebraic sum of said first and second signals is used to control the speed of the pair of rolls immediately adjacent to a downstream from the depending loop being sensed.